United States Patent
Smith et al.

(10) Patent No.: US 7,143,135 B2
(45) Date of Patent: Nov. 28, 2006

(54) AUTOMATIC PARTICIPANT EVALUATION IN COMPUTER MEDIATED PERSISTENT CONVERSATIONS

(75) Inventors: Marc A. Smith, Redmond, WA (US); Duncan L. Davenport, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 10/071,575

(22) Filed: Feb. 8, 2002

(65) Prior Publication Data
US 2003/0154248 A1 Aug. 14, 2003

(51) Int. Cl.
G06F 15/16 (2006.01)

(52) U.S. Cl. .................. 709/204; 709/206; 709/246
(58) Field of Classification Search ........... 709/204, 709/206, 246; 715/526, 751
See application file for complete search history.

(56) References Cited

U.S. PATENT DOCUMENTS

| | | | | |
|---|---|---|---|---|
| 5,799,151 | A * | 8/1998 | Hoffer ................ | 709/204 |
| 5,822,523 | A * | 10/1998 | Rothschild et al. ....... | 709/236 |
| 5,948,054 | A * | 9/1999 | Nielsen ................ | 709/200 |
| 6,222,534 | B1 * | 4/2001 | Ohishi et al. ............ | 345/672 |
| 6,250,930 | B1 * | 6/2001 | Mintz ................... | 434/323 |
| 6,347,307 | B1 * | 2/2002 | Sandhu et al. .......... | 705/36 R |
| 6,449,646 | B1 * | 9/2002 | Sikora et al. ........... | 709/226 |
| 6,480,885 | B1 * | 11/2002 | Olivier ................. | 709/207 |
| 6,493,703 | B1 * | 12/2002 | Knight et al. ............ | 707/3 |
| 6,515,681 | B1 * | 2/2003 | Knight ................. | 715/751 |
| 6,557,027 | B1 * | 4/2003 | Cragun ................. | 709/204 |
| 6,594,673 | B1 * | 7/2003 | Smith et al. ........... | 707/104.1 |
| 6,792,448 | B1 * | 9/2004 | Smith .................. | 709/204 |
| 6,865,715 | B1 * | 3/2005 | Uchino et al. ........... | 715/526 |
| 2002/0062368 | A1 * | 5/2002 | Holtzman et al. ........ | 709/224 |
| 2002/0095454 | A1 * | 7/2002 | Reed et al. ............. | 709/201 |

* cited by examiner

*Primary Examiner*—Saleh Najjar
*Assistant Examiner*—V. Korobov
(74) *Attorney, Agent, or Firm*—Lyon & Harr, LLP; Richard T Lyon

(57) ABSTRACT

Information is provided about the histories of authors in a computer mediated persistent conversation such as a newsgroup. The information may include any or all of how long an author has been active in the group, in what other newsgroups the author participates, to what other threads of conversation the author contributes, and which other participants the author most often engages in discussion. This information may be obtained as an aggregation of data obtained from the groups or communities automatically. The information about any selected user or group is then made available or otherwise provided to any other users so that they can decide whether the selected user or group is likely to provide helpful or useful information. Also, particular message type indicators may be applied to messages when they are posted by users. The message type indicators may also be obtained as an aggregation of data obtained from the groups or communities automatically.

22 Claims, 9 Drawing Sheets

Fig. 1

*How true is true?* [View All] Mootsie Jan-09-02, 03:11 PM
    A sort of sliding scale kind of thing. Spoke Wrench Jan-09-02, 03:25 PM
    That silly millimeter Klrons Jan-09-02, 04:42 PM
    re: How true is true? grzy Jan-09-02, 04:13 PM
    whilst on the topic... happy happy Jan-10-02, 12:38 AM
    Good question! Spoke Wrench Jan-10-02, 06:48 AM
    The things that I shoot for... GregTr Jan-10-02, 06:31 AM

New Floor Pump [View All] SGore Jan-09-02, 03:05 PM
    1 bar=14.50377 psi (nt) Luis Jan-09-02, 03:24 PM
    OK. I see that..... SGore Jan-09-02, 03:37 PM
    Sure enough.... SGore Jan-09-02, 03:41 PM
    Not completely clear Klrons Jan-09-02, 05:15 PM
        Sure Enough.... SGore Jan-09-02, 05:48 PM
    Standard atmosphere DCP Jan-09-02, 06:59 PM
    re: New Floor Pump SnowBlind Jan-09-02, 03:54 PM simple question [View All] whlogls Jan-09-02, 01:42 PM
    re: simple question rastill Jan-09-02, 01:55 PM
    re: simple question whlogls Jan-09-02, 06:36 PM

Wingate Results?? [View All] JBerg Jan-09-02, 01:00 PM
    re: Wingate Results?? Jon Jan-09-02, 02:01 PM Prior Art

Fig. 5A

User Profile Interface

Home | Events/Training | Subscribe | About Microsoft | US/Worldwide | Downloads | Contact Us | MSN.com Hello Marc Smith

*— 500*

| | |
|---|---|
| Full Name: | Marc Smith |
| Profession: | Researcher |
| Phone: | 12121212 x 3333 |
| Private Email: | marc@hotmail.com |
| Community Name: | SQL2000 |
| Community Email: | SQL@ms.com |

*502*

| | |
|---|---|
| First Seen: | 10/10/1998 |
| Last Seen: | 10/1/2000 |

*506*

Total Posts *504*

| | |
|---|---|
| Q's: | 12 |
| A's: | 23 |
| Closed A's: | 3 |
| Book Reviews: | 13 |
| Events: | 5 |
| Last Updated: | 10/1/2000 |

*508*

Edit Profile

My Questions

There are 30 questions open, 16 closed. Average time to close: 25 hours.

- What is the benefit of xml?     Asked on 11/01/00     Elapsed time: 23 hours
  - Answer from jhon@net.com (B)     on 11/02/00
  - Answer from mike@net.com (B)     on 11/02/00     *510*
  - Answer from bob@net.com (B)     on 11/02/00

- Is ASP+ Java compatible?     Asked on 11/14/00     Elapsed time: 35 hours
  - Answer from marc@net.com (A)     on 11/02/00
  - Answer from tom@net.com (B-)     on 11/02/00
  - Answer from duncan@net.com (B)     on 11/02/00

More Questions

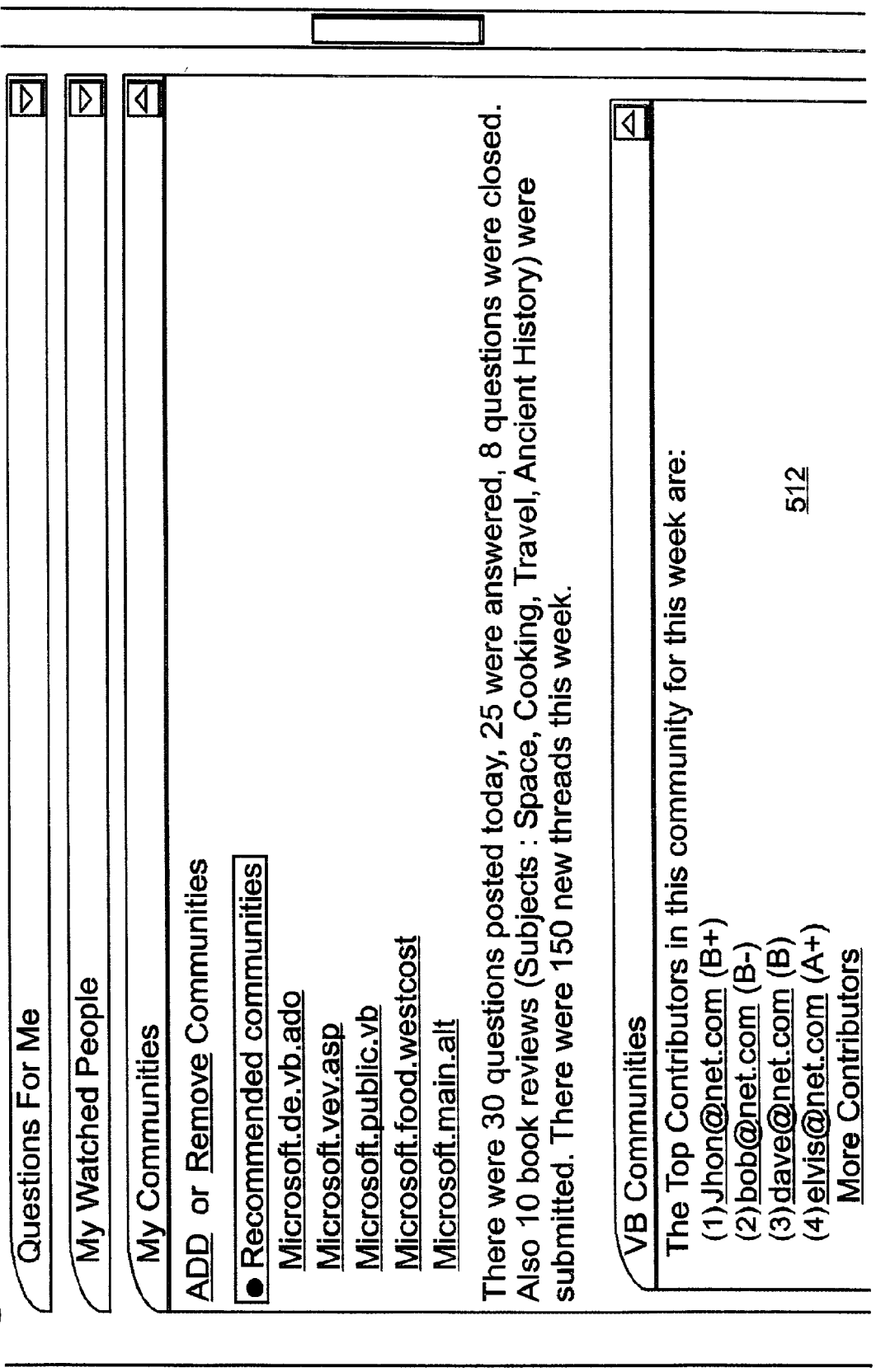

Fig. 5C

Hot Threads

| Subject | Posts | Posters | Reputation |
|---|---|---|---|
| VB7 and the web | 132 | 25 | B+ |
| XML Schema | 111 | 20 | A |
| The future of VB.NET | 90 | 22 | B- |
| More... | | | |

Threads I'm Watching

| Subject | Posts | Posters | Reputation |
|---|---|---|---|
| VB7 and the web | 132 | 25 | B+ |
| XML Schema | 111 | 20 | A |
| More... | | | |

New Content

- Book review 42 new, 168 this month

| | | |
|---|---|---|
| Man on the Moon | By paul@net.com (B+) | On 10/1/00 |
| The Prophet | By Jhon@net.com (B+) | On 10/13/00 |
| Man on the Moon | By James@net.com (B) | On 10/23/00 |

More Reviews...

- Events 12 new, 25 this month

| | | | |
|---|---|---|---|
| VB Conference | By jmes@net.com (B) | On 10/21/00 | at MSR (112) |
| SQL2000 discussion | By brian@net.com (B+) | On 10/11/00 | at Redmond |
| XML Conference | By kevin@net.com (B+) | On 10/1/00 | at the hall |

More Events...

Fig. 5D

- Open Questions 112 new, 468 this month
  - C++ COM? — By james@net.com (B) — On 10/21/00
  - XSL and the web? — By james@net.com (B) — On 10/3/00
  - VML and compatibility? — By yara@net.com (B) — On 10/3/00
  - More Open Questions

- Recently Closed Questions 12 new, 48 this month
  - C++ COM? — By james@net.com (B) — On 10/21/00
  - XSL and the web? — By james@net.com (B) — On 10/3/00
  - More Recently Closed Questions

- New FAQ's 7 New, 12 This Month
  - The Reality of The Internet — By james@net.com (B) — On 10/21/00
  - XSL and the web? — By paul@net.com (B+) — On 10/3/00
  - More NEW FAQ's

- NEW Nominated FAQ's. Vote: 17 new, 22 this month
  - The Reality of the Internet — By james@net.com (B) — On 10/21/00
  - XSL and the web? — By paul@net.com (B+) — On 10/3/00
  - More NEW Nominated FAQ's

ASP+ Communities

The Top Contributors in this community for this week are:

(1) jhon@net.com (B+)
(2) bob@net.com (B-)
(3) dave@net.com (B)
(4) elvis@net.com (A+)
More Contributors

512

Hot Threads

| Subject | Posts | Posters | Reputation |
|---|---|---|---|
| VB7 and the web | 132 | 25 | B+ |
| XML Schema | 111 | 20 | A | ion, particular, to automatic evaluation of participants in such conversations.

AUTOMATIC PARTICIPANT EVALUATION IN COMPUTER MEDIATED PERSISTENT CONVERSATIONS

FIELD OF THE INVENTION

The present invention relates to computer mediated persistent conversations such as Usenet newsgroups, email lists, and Web-based discussion boards and, in particular, to automatic evaluation of participants in such conversations.

BACKGROUND AND SUMMARY OF THE INVENTION

There are a wide variety of computer mediated persistent conversations, such as those that arise in various networked computer contexts, including Usenet (NNTP) newsgroups, World Wide Web (HTTP) message board or bulletin board sites, email lists, chat rooms, multi-user dungeons (MUDs), multi-user games and graphical virtual worlds, etc. These computer mediated persistent conversations are used singly and in concert to create an increasing number of social cyberspaces, groups, or communities that allow groups of people to gather on-line and interact with each other.

While such computer mediated persistent conversations are becoming increasingly popular, there are a number of problems and difficulties facing the users of such media. The interaction context, or information, about the kind of space, group, and activity taking place in these media are frequently missing or ambiguous. This makes finding groups to participate in and people to interact with difficult. The history and structure of groups often become apparent only after extended participation. As a result, many of these media remain complex and confusingly tangled spaces in which it is difficult for users to navigate and participate.

One example of such an interaction medium or environment is Usenet, which is a collection of messages, referred to as posts, available through the Network News Transport Protocol (NNTP). The posts available through NNTP are organized into newsgroups that are named according to a hierarchical name convention. At the highest level there are numerous general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.perl.misc or rec.pets.misc, kids.pregnancy).

Public, online social spaces like Usenet newsgroups are frequently noisy and voluminous places. Larger groups regularly receive more than ten thousand messages a month; many of these messages being of limited value. Despite the many advantages groups of people gain when they interact through computer networks, enough poor-quality messages flood newsgroups and similar public discussions that finding the valuable content typically proves too difficult to be worthwhile.

Efforts to address this issue have primarily focused on methods for groups of people to share their opinions of the messages and authors contributing content to a social cyberspace. These techniques, used by Web sites like online auctioneer eBay.com and Linux news provider Slashdot.org, face the dual challenges of attracting a critical mass of people willing to contribute evaluations and ensuring the quality of those evaluations. Even when they meet these dual challenges, conventional network sites have not succeeded in using the information to reduce the noise and prevent the abuse that often prevail in online public spaces. The rampant misuse of these common spaces is one of the reasons many people who once used Usenet no longer do so.

Therefore, an aspect of the present invention is a determination that explicit participation or feedback of users may not be required to assess other users as to which authors and messages are valuable. This invention can automatically bring to online spaces or communities social context and interactional history that can help users evaluate other users.

In one implementation, the present invention provides information about the histories of the authors or users in a computer mediated persistent conversation, such as a newsgroup. The information can include how long a user has been active in the group, in what other newsgroups the user participates, to what other threads of conversation the user contributes, and which other users or participants the user most often engages in discussion. This information may be obtained as an aggregation of data that is obtained from the groups or communities automatically. The information about any selected user or group is then made available or otherwise provided to any other users so that they can decide whether the selected user or group is likely to provide helpful or useful information.

In an alternative implementation, particular message type indicators may be applied to messages when they are posted. The message type indicators may also be obtained as an aggregation of data obtained from the groups or communities automatically. The message type indicators may be made available, either alone or with any other information about any selected user or group, so that other users can decide whether the selected user or group is likely to provide helpful or useful information.

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is a diagram illustrating an exemplary prior art computer display visualization of threaded posts or messages in a threaded information system such as a newsgroup.

FIGS. 5A–5E are illustrations of successive screens of a profile user interface that is rendered on a display screen of a user or client computer.

DETAILED DESCRIPTION OF PREFERRED EMBODIMENTS

Figure 2:
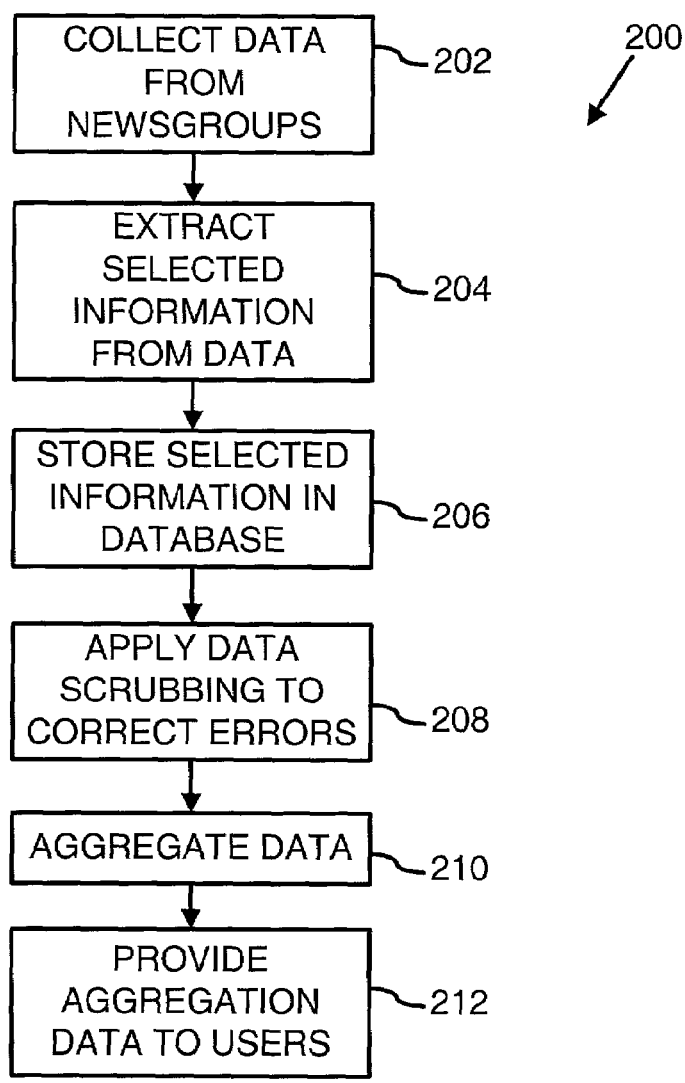
FIG. 2 is a flow diagram of a participant evaluation method for automatically evaluating participants in computer mediated persistent conversations according to the present invention.

The present invention relates to computer mediated persistent conversations, such as those that arise in various networked computer contexts, including Usenet (NNTP) newsgroups, World Wide Web (HTTP) message board or bulletin board sites, email lists, chat rooms, etc. The following description refers to Usenet newsgroups, but is similarly applicable to other computer mediated persistent conversations.

Usenet is a collection of messages, referred to as posts, available through the Network News Transport Protocol (NNTP). The posts available through NNTP are organized into newsgroups that are named according to a hierarchical name convention. At the highest level are 15 or more general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.perl.misc or rec.pets.misc.kids.pregnancy). Many posts reference or reply to another post. As an organizational aid, posts that reference or reply to another post are nested or positioned directly under it to form a "thread." Threads are organizational trees with an initial post at a top level and branches to all the responsive posts.

FIG. 1 is a diagram illustrating an exemplary prior art computer display visualization 100 of threaded posts or messages 102 in a threaded information system such as a newsgroup or a Web-based message board. Every post 102 in visualization 100 is identified by text, such as the subject line or title for the post, author, and the date and time of the post. It will be appreciated, however, that each post or message in the newsgroup typically includes in its body text or other information (e.g., data files or hyperlinks) in addition to the subject line or title. Accordingly, it will be understood that posts 102 in visualization 100 are representations of underlying posted information (e.g., messages).

Posts 102 that reference other posts are arranged as threads 106. Posts that do not reference other posts may be referred to as top-level or initiating posts 102', which are a subset of posts 102. Top-level posts 102' initiate threads 106. Although a threaded information environment will commonly include many threads 106, at least some top-level posts 102' are typically not referenced by other posts 102.

The present invention is directed to helping users or readers of computer mediated persistent conversations (e.g., newsgroups) quickly find messages that they would actually like to read and avoid messages they would prefer not to read. For casual newsgroup users, such a system would reduce the clutter of undesirable messages and point them to authors and messages that are more likely to be of value. More serious newsgroup users, especially those who primarily seek technical solutions, could benefit greatly from a system that helps them efficiently find what they are looking for amid the scores or even hundreds of daily posts.

Figure 3:
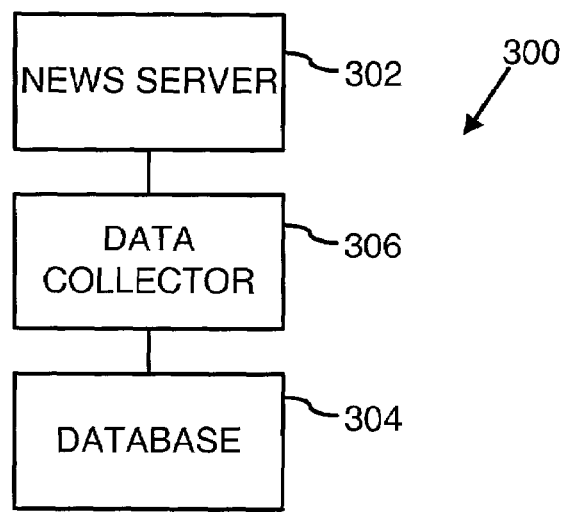
FIG. 3 is a block diagram of a participant evaluation system.

FIG. 2 is a flow diagram of a participant evaluation method 200 for automatically evaluating participants in computer mediated persistent conversations, such as Usenet newsgroups. FIG. 3 is a block diagram of a participant evaluation system 300 that utilizes method 200. By the following description it will be appreciated that participant characterization method 200 may be computer-implemented in accordance with corresponding software instructions.

Process block 202 indicates that data (e.g., newsgroup posts and related information) are collected from a collection of conversations groups or newsgroups. The data may be collected by a conventional news server 302 (e.g., a conventional Usenet News (NNTP) server). In one exemplary implementation, news server 302 carries nearly 50,000 Usenet (NNTP) newsgroups, collecting all the messages in all the newsgroups. It will be appreciated, however, that news server 302 may carry fewer or more newsgroups and may collect less than entire messages in the newsgroups.

Process block 204 indicates that selected information is extracted from news server 302 and prepared for insertion into a database 304 (e.g., a SQL database). With reference to system 300, the selected information is extracted from news server 302 by a data collector 306. An example of data collector 306 is referred to as Netscan: A tool for measuring and mapping social cyberspaces, and use of it is available from the assignee of the present invention at "netscan.research.microsoft.com". The exemplary Netscan data collector 306 communicates with news server 302, obtaining selected information from the message headers for storage in database 304.

Process block 206 indicates that the selected information is stored in database 304.

Process block 208 indicates that one or more data scrubbing techniques are used to correct errors and anomalies in the raw data stored in database 304. Errors and anomalies that may be corrected include damage to thread structure data, localized variations in date and time stamps, and author identities. The data scrubbing techniques are directed to identifying such predefined errors and anomalies and corrects them by correcting thread data structure based on implicit or apparent thread relationships between messages, converting all date and time stamps to a common standard (e.g., Greenwich Mean Time), and discerning unique user identities based on user email addresses or combinations of email addresses and name aliases.

Process block 210 indicates that aggregation is applied to the data stored in database 304. As is known in the art, data aggregation (sometimes called "data scraping") is a process in which information is gathered and expressed in a summary form. In one implementation, the aggregation applied to the data stored in database 304 generates a multidimensional data space with three primary dimensions: Time, Newsgroup, and Authors. For example, that multidimensional data space may include any or all of the following aggregations of message data:

Time: day, week, month, quarter, year, YTD, all resolutions

Newsgroup: leaf newsgroup, 1st, 2nd, and 3rd newsgroup level aggregations

Authors: 1st and 2nd level user domain and full email address

Examples of particular data aggregations that can be used to evaluate an author or newsgroup are listed below. It will be appreciated that any, or all, or other data aggregations that can be used to evaluate an author or newsgroup. The exemplary data aggregations are:

The total number of newsgroups to which an author posted at least a single message.

The dates the author was first and last seen in any newsgroup across the Usenet as well as in a selected or focal newsgroup.

The number of days on which the author posted one or more messages to any newsgroup across the Usenet as well as in the focal newsgroup.

The total number of messages the author posted to any newsgroup across the Usenet as well as the number posted to the focal newsgroup.

The total number of messages the author posted to any newsgroup across the Usenet as well as the number posted to the focal newsgroup that were initial turns ("thread heads").

The total number of messages the author posted to any newsgroup across the Usenet as well as the number posted to the focal newsgroup that were responses to other messages ("replies").

The total number of other authors to whom the author replied in any newsgroup across the Usenet as well as the number replied to within the focal newsgroup ("reply targets").

The total number of replies to messages posted by each author in any newsgroup across the Usenet as well as the number replied to within the focal newsgroup ("responses").

The total number of other authors who responded to messages the author posted in any newsgroup across the Usenet as well as the number responded to within the focal newsgroup ("reply targets").

The total number of threads to which the author posted at least a single message in any newsgroup across the Usenet as well as the number of threads in the focal newsgroup.

The average number of messages each author posted in each thread they joined both in any newsgroup across the Usenet as well as within the focal newsgroup.

The average number of generations ("depth") of turns and reply messages of each of the threads the author posted to in any newsgroup across the Usenet as well as in the focal newsgroup.

The average number of sibling turns beneath each parent message ("breadth") in each of the threads the author posted to in any newsgroup across the Usenet as well as in the focal newsgroup.

Process block 212 indicates that the aggregation data are made available to users, such as in a communities portal network site or a profile that is provided with reference to a user or a newsgroup. For example, making the aggregation data available may include providing a network (e.g., World Wide Web) interface to the data via selected queries and reports that can provide including visualizations of threads, aggregations of newsgroups and data about authors. Also, a registration system may authenticate users and link them to a profile store. In addition, a series of customized queries can be generated to address a user's contexts and memberships. For example, a user may access different Usenet segments according to the user's different roles, such as a professional role relating to the user's work or profession, a parenting role relating to the user's interests as a parent, or a gamer role relating to the user's interests in online and other computer-based games.

The data aggregations obtained by method 200 can provide participation metrics for evaluating or characterizing participants in computer mediated persistent conversations. The participation metrics relating to an author or group can be positive, or negative, indications of whether other the author or group is likely to provide useful information to other users. The participation metrics are objective characterizations from which other users can base subjective judgments about the quality or characteristics of information from a particular author or group.

Listed below are examples of participation metrics by which authors have been correlated positively with user impressions of the quality of information provided by an author:

The number of days on which the author posted in the focal newsgroup and in all newsgroups The number of messages the author posted in the focal newsgroup and in all newsgroups The number of distinct threads in which the author participates in the focal newsgroup The depth and breadth of the threads in which the author participates Depth of threads in the focal newsgroup Breadth of threads in the focal newsgroup Depth of threads in all newsgroups Breadth of threads in all newsgroups The fraction of the author's messages which are replies, in the focal group and in all newsgroups The number of distinct people to whose messages the author replies in the focal newsgroup and in all newsgroups The number of replies which the author's messages garner in the focal group and in all newsgroups The number of distinct people who reply to the author's messages in the focal group and in all newsgroups As an example, authors with relatively high values for the following participation metrics may commonly be deemed by others to be high quality participants who contribute meaningfully to a group:

The fraction of the author's messages which are replies in the focal newsgroup and across all newsgroups The number of replies, reply targets, responses, and response targets across all newsgroups The number of days on which the author posted in the focal newsgroup and across all newsgroups An author with high values for these participation metrics may be interpreted as an author who participates actively and regularly in a variety of in-depth conversations, in which he or she responds to other participants but does not overwhelm the discussion, or, participate in too many different newsgroups.

As another example, authors with relatively high values for the following participation metrics may commonly be considered negatively or unfavorably by others: the total number of newsgroups in which an author has posted and the average number of messages the author posted in the threads in which he or she participated. A high value for the latter participation metric can represent a person who dominates the conversations that they join.

Figure 4:
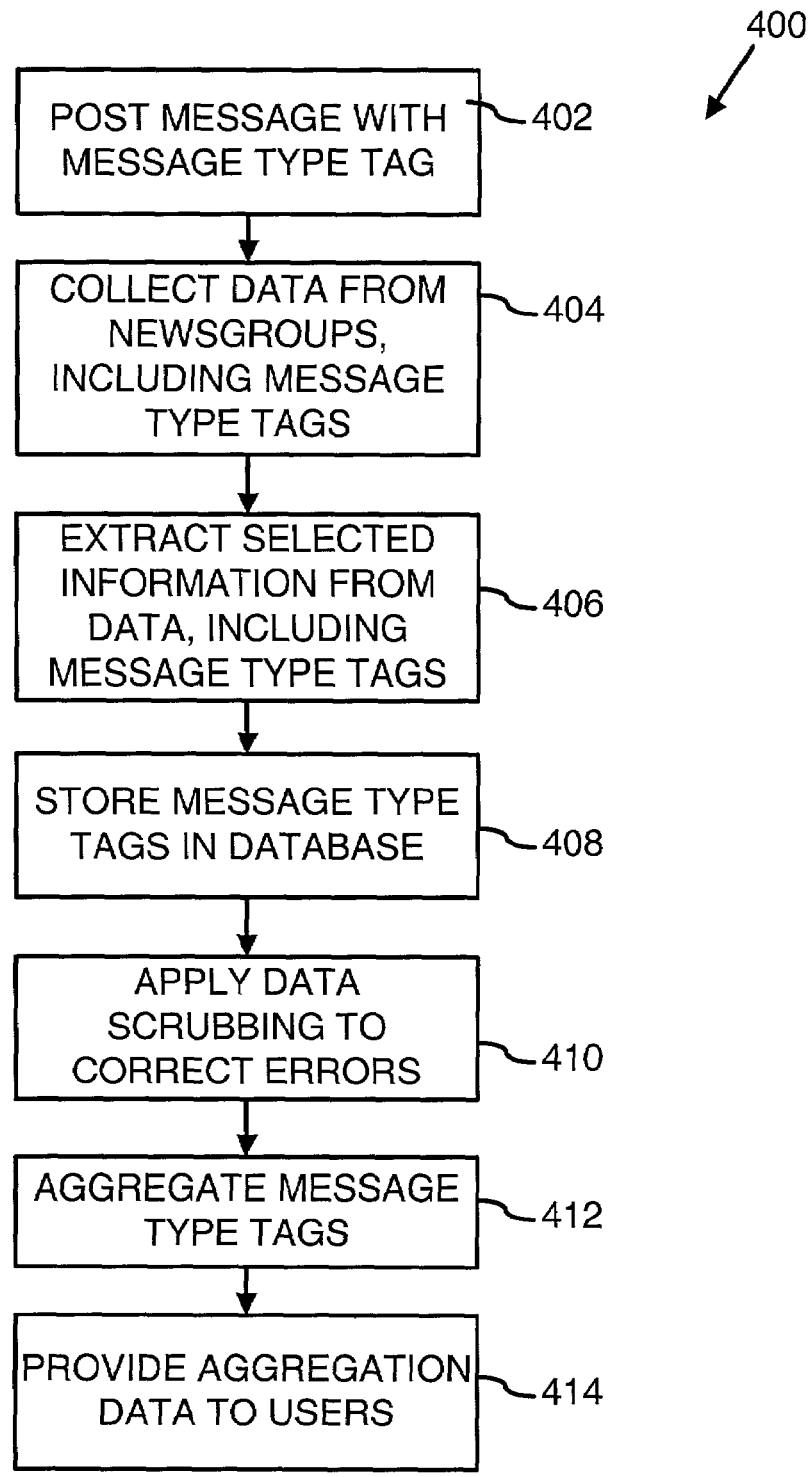
FIG. 4 is a flow diagram of an alternative participant evaluation method for automatically evaluating participants in computer mediated persistent conversations.

FIG. 4 is a flow diagram of an alternative participant evaluation method 400 for automatically evaluating participants in computer mediated persistent conversations, such as Usenet newsgroups. Participant evaluation method 400 may be used alone or in combination with participant evaluation method 200.

Process block 402 indicates that at least some messages in a group are posted by authors with a tag, indicator, or identifier that identifies the message as being of a selected message type. For example, the tag may be of an XML format. As examples, the message types may include Question, indicating that a message is a question posed to other users in the group, Answer, indicating that a message is a response to a question posed by another user in the group. In addition, the author of an original Question may also post a Closed message, which indicates that or identifies an Answer message as resolving to the author's Question message. It will be appreciated that other selected message types could also be supported, either alone or with the Question, Answer, and Closed message types. The other selected message types could include Review, which indicates that a message is a review of a work such as a book, article, film, etc., Event message types that identify a past or future event, FAQ message types that identify Frequently Asked Questions, as well as message types that are particularly suited for or extensible to particular discussion spaces.

For example, in a discussion space for investors may include a data type claim in which a user claims that an investment instrument (e.g., a stock) will reach a certain price by a certain time. The user may be characterized by the number of such claims that are made and that prove to be accurate (or inaccurate) within a predefined margin. As another example, a discussion space for software developers may include a Code Sample message type indicating that the message includes software code, as well as the language of the software, the operating system to which it's adapted, etc.

An aspect of the Closed message type is that it acknowledges the author who posts the resolving Answer, based upon the subjective judgment of the author who posed the original Question. As described below, this acknowledgement can function as a participation incentive for authors to provide high-quality, substantive contributions.

Process block 404 indicates that data (e.g., newsgroup posts) are collected from a collection of newsgroups, the data including the message type identifiers. For example, the data may be collected by a conventional news server 302 (e.g., a conventional Usenet News (NNTP) server) that is modified to also collect the message type identifiers.

Process block 406 indicates that selected information is extracted from news server 302 and prepared for insertion into database 304, the selected information including the message type identifiers.

Process block 408 indicates that the message type identifier information is stored in database 304.

Process block 410 indicates that one or more data scrubbing techniques are used to correct errors and anomalies in the raw data stored in database 304.

Process block 412 indicates that aggregation is applied to the message type identifier information stored in database 304, the aggregation including correlating the message type identifier information with corresponding authors.

Process block 414 indicates that the aggregation data are made available to users, such as in a communities portal network site or a profile that is provided with reference to a user or a newsgroup. It will be appreciated that the aggregation data may also be made available to users as a network service that is accessible by software on behalf of the user, rather than being accessed by the user manually, such as in program-to-program integration over a network like the Internet.

An aspect of alternative participant evaluation method 400 is that it can function as an incentive for providing high-quality, substantive contributions to computer mediated persistent conversations. The combination of message type identifiers with acknowledgement of resolving Answers allows authors to establish a positive reputation for resolving Questions based upon feedback from other participants in a group. Such positive reputations can allow authors to distinguish themselves as experts or as being helpful and thereby encourage other users to seek the professional advise or assistance of these authors.

FIGS. 5A–5E are illustrations of successive screens of a profile user interface 500 that is rendered on a display screen of a user or client computer for providing a user with aggregation data relating to a user or group. It will be appreciated that profile user interface 500 illustrates the aggregation data rendered in one exemplary implementation of the operation of process blocks 212 and 412. It will be appreciated that profile user interface 500 could include any or all of the illustrated data aggregations, as well as any of the others referred to or described herein.

Profile user interface 500 includes a user identification segment 502 that typically includes at least a user screen name, but may also include any or all of the user's actual name, email address, and any other contact or identifying information. Initial and most recent date fields 504 and 506 indicate when the user first joined a group or "community" of groups and when the user last visited the group or community, respectively.

A message type summary segment 508 may indicate counts of specified message types that the user has contributed to the group or community. In the illustrated implementation, message type summary segment 508 may include counts of Questions message types posted, Answer message types posted, Answer message types designated as Closing a question, Review message types, and Event message types. A "last updated" field may also be included to indicate when message type summary segment 508 was last updated.

A questions posted segment 510 may be included to list questions or other initiating messages posted by the user in the group or community, together with any replies that have been posted. A group summary segment 512 may also be included for each group or community that the user specifies or participates in. The group summary segment 512 provides background on the user's interests and may include various characterizations of the group or community, including summary characterizations of frequent contributors, listings of active conversations or threads, an identification of most recent messages of one or more message types.

Figure 6:
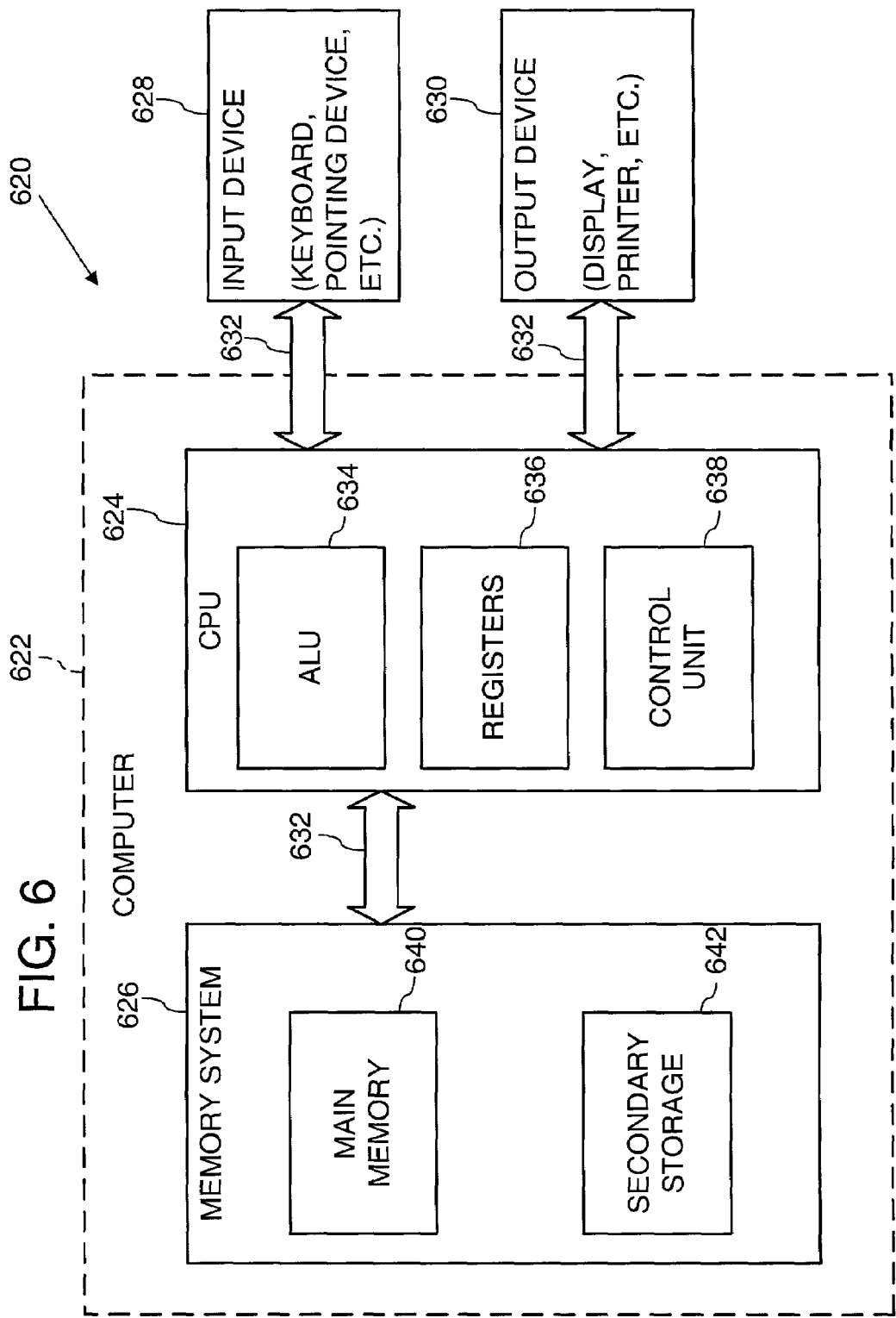
FIG. 6 is a block diagram of a computer system that may be used to implement the present invention.

FIG. 6 illustrates an operating environment for an embodiment of the present invention as a computer system 620 with a computer 622 that comprises at least one high speed processing unit (CPU) 624 in conjunction with a memory system 626, an input device 628, and an output device 630. These elements are interconnected by at least one bus structure 632.

The illustrated CPU 624 is of familiar design and includes an ALU 634 for performing computations, a collection of registers 636 for temporary storage of data and instructions, and a control unit 638 for controlling operation of the system 620. The CPU 624 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 626 generally includes high-speed main memory 640 in the form of a medium such as random access memory (RAM) and read only memory (ROM) semiconductor devices, and secondary storage 642 in the form of long term storage mediums such as floppy disks, hard disks, tape, CD-ROM, flash memory, etc. and other devices that store data using electrical, magnetic, optical or other recording media. The main memory 640 also can include video display memory for displaying images through a display device. Those skilled in the art will recognize that the memory 626 can comprise a variety of alternative components having a variety of storage capacities.

The input and output devices 628 and 630 also are familiar. The input device 628 can comprise a keyboard, a mouse, a physical transducer (e.g., a microphone), etc. The output device 630 can comprise a display, a printer, a transducer (e.g., a speaker), etc. Some devices, such as a network interface or a modem, can be used as input and/or output devices.

As is familiar to those skilled in the art, the computer system 620 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 626.

In accordance with the practices of persons skilled in the art of computer programming, the present invention is described below with reference to acts and symbolic representations of operations that are performed by computer system 620, unless indicated otherwise. Such acts and operations are sometimes referred to as being computer-executed and may be associated with the operating system or the application program as appropriate. It will be appreciated that the acts and symbolically represented operations include the manipulation by the CPU 624 of electrical signals representing data bits which causes a resulting transformation or reduction of the electrical signal representation, and the maintenance of data bits at memory locations in memory system 626 to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. In a computer mediated persistent conversation system having one or more computers with which each of multiple users author and post messages in one or more conversations, the system including a computer-readable medium that stores computer software instructions for operating the system, the instructions comprising:
   obtaining selected information from the one or more conversations;
   storing the selected information and forming from it aggregated conversation data that includes aggregations according to time, conversation, and authoring user;
   tagging the messages when they are posted by authoring users, wherein tagging a message comprises inserting a tag into the message, wherein the tag identifies the message as being of one or more selected message types comprising a Question message type indicating that a message is a question and an Answer message type indicating that a message is an answer to a Question message type, whereby the tagged messages allow said users to decide whether a conversation is likely to provide useful information; and
   providing the aggregated conversation data and message type tags to users of the computer mediated persistent conversation system.

2. The system of claim 1 in which the computer mediated persistent conversation system includes any of Usenet (NNTP) newsgroups, World Wide Web (HTTP) message or bulletin board sites, email lists, or online chat rooms.

3. The system of claim 1 in which the aggregated conversation data includes plural aggregations according to plural time periods or resolutions.

4. The system of claim 3 in which the plural aggregations according to plural time periods or resolutions include aggregations according to the time periods or resolutions: day, week, month, quarter, year, year-to-date.

5. The system of claim 1 in which the aggregated conversation data includes plural aggregations according to plural conversation characteristics or identifiers.

6. The system of claim 5 in which plural conversations are related by plural hierarchical levels of organization, the plural aggregations according to plural conversation characteristics or identifiers including aggregations according to two or more of the hierarchical levels of organization.

7. The system of claim 1 in which the aggregated conversation data includes plural aggregations according to plural authoring user characteristics or identifiers.

8. The system of claim 7 in which the plural authoring user characteristics or identifiers correspond to plural hierarchical levels of authoring user identifiers, the plural aggregations according to plural authoring user characteristics or identifiers including aggregations according to two or more of the hierarchical levels of authoring user identifiers.

9. The system of claim 1 in which one or more reply messages respond to an initial message and the aggregated conversation data provided to users includes an indication of a fraction of an authoring user's messages that are replies in a selected one of the conversations relative to the authoring user's reply messages in all of the conversations.

10. The system of claim 1 in which one or more reply messages respond to an initial message and the aggregated conversation data provided to users includes an indication of a number of replies by an authoring user and a number of initial messages to which replies are posted.

11. The system of claim 1 in which one or more reply messages respond to an initial message and the aggregated conversation data provided to users includes an indication of a number of days on which an authoring user posted a message in a selected one of the one or more conversations relative to a number of days on which an authoring user posted a message in any of the one or more conversations.

12. The system of claim 1 in which the one or more selected message types includes a Closed message type indicating that a message of the Answer message type resolves a message of the Question message type.

13. The system of claim 1 in which one or more reply messages respond to an initial message, the one or more selected message types including a Closed message type indicating that a selected reply message resolves the initial message.

14. The system of claim 1 in which the aggregated conversation data are provided to users as a profile that references a selected user or a conversation.

15. The system of claim 1 in which the one or more selected message types further comprises at least one of:
   a Review message type indicating that a message is a review of book, article, film or other piece of work;
   an Event message type indicating that a message identifies a past or future event;
   a FAQ message type indicating that a message identifies Frequently Asked Questions;
   a claim message type indicating that a message includes particular claims made by the authoring user; and
   a Code Sample message type indicating that a message includes software code and supporting information about the software code.

16. A method for mediating persistent conversations between multiple people who author and post messages in one or more of the conversations comprising the actions of:
- obtaining selected information from the one or more conversations;
- storing the selected information and forming from it aggregated conversation data that includes aggregations according to time, conversation, and authoring person;
- tagging the messages when they are posted by authoring people, wherein tagging a message comprises inserting a tag into the message, wherein the tag identifies the message as being of one or more selected message types, comprising a Question message type indicating that a message is a question and an Answer message type indicating that a message is an answer to a Question message type, whereby the tagged messages allow said people to decide whether a conversation is likely to provide useful information; and
- providing the aggregated conversation data and tags identifying the message type to the people.

17. The method of claim 16 in which the messages are authored and posted in any of Usenet (NNTP) newsgroups, World Wide Web (HTTP) message or bulletin board sites, email lists, or online chat rooms.

18. The method of claim 16 in which the messages are authored and posted in Usenet (NNTP) newsgroups.

19. The method of claim 16 in which the one or more selected message types further comprises at least one of:
- a review message type indicating that a message is a review of book, article, film or other piece of work;
- an event message type indicating that a message identifies a past or future event;
- a FAQ message type indicating that a message identifies Frequently Asked Questions;
- a claim message type indicating that a message includes particular claims made by the authoring person; and
- a code sample message type indicating that a message includes software code and supporting information about the software code.

20. A process for mediating one or more persistent conversations between multiple people who author and post messages in one or more of the conversations comprising process actions for:
- obtaining selected information from each conversation;
- storing and aggregating the selected information in different ways including aggregations according to time, conversation, and authoring person;
- tagging the messages when they are posted by authoring people, wherein tagging a message comprises inserting a tag into the message, wherein a the tag identifies the message as being of one or more selected message types, comprising a Question message type indicating that a message is a question and an Answer message type indicating that a message is an answer to a Question message type, whereby the tagged messages allow said people to decide whether a conversation is likely to provide useful information;
- providing the aggregated information and message type tags to the people.

21. The process of claim 20, wherein the one or more selected message types further comprise at least one of:
- a Closed message type indicating either that a message of the Answer message type resolves a message of the Question message type, or that a selected reply message resolves an initial message;
- a Review message type indicating that a message is a review of book, article, film or other piece of work;
- an Event message type indicating that a message identifies a past or future event;
- a FAQ message type indicating that a message identifies Frequently Asked Questions;
- a claim message type indicating that a message includes particular claims made by the authoring person; and
- a Code Sample message type indicating that a message includes software code and supporting information about the software code.

22. The process of claim 20, wherein the aggregated information includes plural aggregations according to plural time periods or resolutions, the plural time periods or resolutions comprising: a day, a week, a month, a quarter, a year, and year-to-date.

* * * * *